United States Patent
Kimelman et al.

(10) Patent No.: US 7,805,557 B2
(45) Date of Patent: Sep. 28, 2010

(54) INTERRUPT CONTROLLER AND METHOD FOR HANDLING INTERRUPTS

(75) Inventors: Paul Kimelman, Alamo, CA (US); Gary Campbell, Corby (GB); Simon Axford, Burwell (GB); Ian Field, Walnut Creek, CA (US)

(73) Assignee: ARM Limited, Cambridge (GB)

( * ) Notice: Subject to any disclaimer, the term of this patent is extended or adjusted under 35 U.S.C. 154(b) by 861 days.

(21) Appl. No.: 11/178,586

(22) Filed: Jul. 12, 2005

(65) Prior Publication Data

US 2007/0016710 A1 Jan. 18, 2007

(51) Int. Cl.
*G06F 13/26* (2006.01)

(52) U.S. Cl. ...................................... 710/264
(58) Field of Classification Search .................. 710/260
See application file for complete search history.

(56) References Cited

U.S. PATENT DOCUMENTS

| | | | |
|---|---|---|---|
| 5,850,521 A * | 12/1998 | Morganti et al. | 709/208 |
| 6,543,000 B1 * | 4/2003 | Wright | 713/500 |
| 6,629,179 B1 * | 9/2003 | Bashford | 710/260 |
| 2004/0117532 A1 * | 6/2004 | Bennett et al. | 710/260 |

\* cited by examiner

*Primary Examiner*—Thomas Lee
*Assistant Examiner*—Mohammed H Rehman
(74) *Attorney, Agent, or Firm*—Nixon & Vanderhye P.C.

(57) ABSTRACT

An interrupt controller and method are provided for handling interrupt requests generated by a plurality of interrupt sources. The interrupt controller comprises pend logic for receiving interrupt requests generated by the plurality of interrupt sources, and for each interrupt request, determining whether to accept that interrupt request for handling by the interrupt controller. Interrupt handling logic then selects an interrupt request from amongst those interrupt requests accepted by the pend logic, and generates an indication of the interrupt routine to be executed by a processor to process that interrupt request. The pend logic is arranged, for each of the interrupt sources, to detect a transition of the associated interrupt request from an unset state to a set state, and to accept the interrupt request upon such detection. The pend logic also receives an exit signal indicating completion of the interrupt routine by the processor, and if the associated interrupt request is in the set state on receipt of the exit signal, re-accepts that interrupt request. By such an approach, the interrupt controller can automatically support both level interrupt requests and pulsed interrupt requests without the need for software configuration.

10 Claims, 8 Drawing Sheets

INTERRUPT CONTROLLER AND METHOD FOR HANDLING INTERRUPTS

FIELD OF THE INVENTION

The present invention relates to an interrupt controller and method for handling interrupts.

BACKGROUND

When devices within a data processing system require a processor within the data processing system, typically the CPU, to perform a service routine, they will typically issue an interrupt request to that processor. When an interrupt request is received by the processor whilst it is executing a main process, the processor will typically temporarily interrupt the main process under execution, and instead execute the Interrupt Service Routine (ISR) specified by the interrupt request. The devices may be on the same chip as the processor, or may be off-chip. In a typical data processing system there will often be multiple devices which can issue such interrupt requests, and since the processor cannot simultaneously execute the ISRs defined by the plurality of interrupt requests, it is known to provide an interrupt controller for receiving the various interrupt requests, and prioritizing between them. Hence, interrupt requests from certain devices (for example a network interface) can be given higher priority than interrupt requests from other devices (for example a keyboard).

In a vectored interrupt controller (VIC) the controller will store a list of vector numbers for ISRs that are associated with each interrupt source, i.e. each device that can issue an interrupt request. Hence, when an interrupt request is received, the VIC can pass the exact location of the associated ISR code to the processor to enable the processor to begin execution of that ISR.

The interrupt requests that are issued by devices may take a variety of forms. In particular, depending on how the device is configured, an interrupt request may be issued as a level interrupt signal or a pulsed interrupt signal. A level interrupt signal is an interrupt signal that is held asserted until cleared by some action from the ISR, such action being for example the reading or writing of a register, or the draining of actual data waiting to be actioned by that ISR. Hence, devices that use such level interrupt signals will keep the interrupt signal asserted until they have some form of acknowledgement that the event causing that interrupt request to be issued has been handled.

A pulsed interrupt signal is an edge interrupt signal which is held for at least one clock cycle so that it can be sampled on a clock edge. An edge interrupt is an interrupt which asserts for a short period and is to be detected from its edge, i.e. its transition from a clear to a set state. Such edge detection does not need to be clock based, and is used commonly with timers and other devices where an acknowledgement is not needed. The pulsed interrupt signal is hence like an edge interrupt signal, except that it is read at a clear level and then subsequently read at a set level for at least one clock period in order to be treated as an edge. An edge can be converted to a pulse if required using a number of flops to synchronize the edge with the clock.

Hence, it can be seen that a key distinguishing factor between a level interrupt and a pulsed interrupt is whether the interrupt needs to be acknowledged (a level interrupt) or is self-acknowledging (a pulsed interrupt).

Known interrupt controllers have needed to know which type of interrupt signal will be issued by the devices, in order to ensure correct handling of the interrupt requests. Generally this is handled in two ways in prior art interrupt controllers. In accordance with one prior art technique, the particular inputs to the interrupt controller are arranged at the hardware level as either level triggered inputs or pulse triggered inputs. From the above discussion it is to be noted that a pulse triggered input will have an edge which is of relatively short duration but is longer than a clock period to enable it to be sampled. Hence, a device which issues level interrupt requests will be connected to an input of the interrupt controller that is level triggered, whilst a device that issues pulsed interrupt requests will be connected to an input of the interrupt controller that is pulse triggered. Whilst this approach enables correct handling of the interrupt requests issued by the various devices, it lacks flexibility, and requires a knowledge of the devices at the time the interrupt controller is built.

An alternative approach that has been used in prior art interrupt controllers is to provide, for each input of the interrupt controller, both hardware to handle level interrupts and hardware to handle pulsed interrupts. Configuration bits are then provided which can be set by software to identify for each input whether the device connected thereto is either a device issuing level interrupt requests or a device issuing pulsed interrupt requests. The configuration bits then control appropriate selection of the hardware provided in association with each input of the interrupt controller. Whilst such an approach provides flexibility with regards to how the interrupt controller is configured having regards to the devices connected thereto, it inherently involves a certain amount of redundancy within the interrupt controller due to the need to provide in association with each input both hardware capable of handling pulsed interrupt signals and hardware capable of handling level interrupt signals. In addition, the software needs to know what form of interrupt signal each device uses and set the configuration bits accordingly. This is not something which the software naturally knows, as the choice can be dependent on many factors.

Accordingly, it would be desirable to provide an improved technique for allowing an interrupt controller to handle both level interrupt requests and pulsed interrupt requests.

SUMMARY

Viewed from a first aspect, the present invention provides an interrupt controller for handling interrupt requests generated by a plurality of interrupt sources, comprising: pend logic operable to receive interrupt requests generated by said plurality of interrupt sources and for each interrupt request to determine whether to accept that interrupt request for handling by the interrupt controller; and interrupt handling logic operable to select an interrupt request from amongst those interrupt requests accepted by the pend logic, and to generate an indication of an interrupt routine to be executed by a processor to process that interrupt request; the pend logic being operable for each of said interrupt sources to detect a transition of the associated interrupt request from an unset state to a set state, and to accept said interrupt request upon said detection; the pend logic being further operable to receive an exit signal indicating completion of said interrupt routine by the processor, and if the associated interrupt request is in the set state on receipt of said exit signal, to re-accept that interrupt request.

Pend logic is operable for each of the interrupt sources to detect a transition of the associated interrupt request from an unset state to a set state, and to accept the interrupt request upon that detection. Subsequently, the pend logic receives an exit signal indicating completion of the relevant interrupt routine by the processor, and if the associated interrupt request is in the set state on receipt of the exit signal, the pend logic then re-accepts that interrupt request.

By this approach, automatic support for both pulsed interrupts and level interrupts is provided without the requirement for software intervention. In particular, when the pend logic detects a transition of an interrupt request from an unset state to a set state, it accepts that interrupt request for handling by the interrupt controller, irrespective of whether that interrupt request is a pulsed interrupt or a level interrupt. In the event of a pulsed interrupt, the interrupt request will naturally return from the set state to the unset state, and typically this will occur shortly after the set state is detected by the pend logic, and in any event before the interrupt routine triggered by that interrupt request has been completed by the processor. However, this is not necessarily the case for a level interrupt, since as mentioned earlier a device issuing a level interrupt signal will hold the signal asserted until the event that caused that device to issue the interrupt signal has been handled. The event in question may, for example, be the reading or writing of a particular device register, or alternatively may be the clearing of a particular buffer. If the ISR does not complete handling of the event, for example because it does not completely clear a buffer, then when the ISR exits, the level interrupt signal will still be asserted. In an interrupt controller that had been designed only to handle pulsed interrupt signals, this continued assertion of the interrupt signal would be overlooked. However, the pend logic is arranged on receiving an exit signal indicating completion of the interrupt routine by the processor, to re-accept the associated interrupt request if that interrupt request is still in the set state on receipt of that exit signal by the pend logic. This ensures correct operation of the interrupt controller with regards to level interrupt requests.

There are a number of ways in which the interrupt controller can be arranged to keep track of interrupt requests being handled by the interrupt controller. In one embodiment, the interrupt controller further comprises first storage providing a pended flag associated with each interrupt source, the pend logic being operable upon accepting an interrupt request to cause the associated pended flag to be set. Hence, the interrupt controller can determine with reference to the first storage which interrupt requests have been accepted for handling by the pend logic.

Further, in one embodiment, the interrupt controller additionally comprises second storage providing an activated flag associated with each interrupt source, upon an indication from the processor that the interrupt routine associated with a particular interrupt request will be executed, the interrupt controller causing the associated activated flag to be set and the associated pended flag to be cleared. The second storage need not be physically separate from the first storage, and indeed in one embodiment the first storage and second storage are provided within a single storage device. In one particular embodiment, the first storage and second storage form part of a status table maintained by the interrupt controller.

Through the combination of the pended flags and activated flags, the interrupt controller can determine which interrupt requests are in the process of being handled by the processor, and which are still pending within the interrupt controller.

In one embodiment, if, for a particular interrupt source, the pend logic detects a transition of the associated interrupt request from an unset state to a set state whilst the associated activated flag is set and the associated pended flag is cleared, the pend logic is operable to re-accept said interrupt request. Through the use of such embodiments, enhanced handling can be provided for pulsed interrupt requests. In particular, if a particular device re-asserts a pulsed interrupt request whilst the ISR triggered from a previous interrupt request from that device is in the process of being executed by the processor (as indicated by the set activated flag), then the pend logic is arranged to re-accept the interrupt request. As a result, this will cause the pended flag to then be set. Such an approach hence avoids the risk that, if a device using pulsed interrupt requests makes a second assertion of a pulsed interrupt request before completion of the ISR execution pertaining to the first assertion of the interrupt request, the second assertion may be lost. This typically can happen as a side effect of processing performed by the ISR, such as for example where the ISR outputs an acknowledgement to a message, causing the sender to issue a further message. Instead of the second assertion being lost, the technique of this embodiment allows a re-pending of the interrupt request once the ISR associated with the first assertion has been activated. Accordingly, when the ISR exits, this causes re-activation of the ISR in order to deal with the second assertion of the interrupt request.

It should be noted that this functionality is also applicable to level interrupts when the ISR fully handles the event that caused the device to issue the interrupt, and hence for example may clear the buffer of the device, but then new data arrives, hence re-triggering an interrupt request, before the ISR exits. In such scenarios, the above-described embodiment allows re-activation of the ISR more quickly than would otherwise occur.

Viewed from a second aspect the present invention provides a method of handling within a data processing apparatus interrupt requests generated by a plurality of interrupt sources, comprising the steps of: (a) receiving interrupt requests generated by said plurality of interrupt sources; (b) for each interrupt request determining whether to accept that interrupt request for handling; and (c) selecting an interrupt request from amongst those interrupt requests accepted at step (b), and generating an indication of an interrupt routine to be executed by a processor to process that interrupt request; said step (b) comprising the steps of: (i) for each of said interrupt sources detecting a transition of the associated interrupt request from an unset state to a set state, and accepting said interrupt request upon said detection; (ii) receiving an exit signal indicating completion of said interrupt routine by the processor, and if the associated interrupt request is in the set state on receipt of said exit signal, re-accepting that interrupt request.

DETAILED DESCRIPTION

Figure 1:
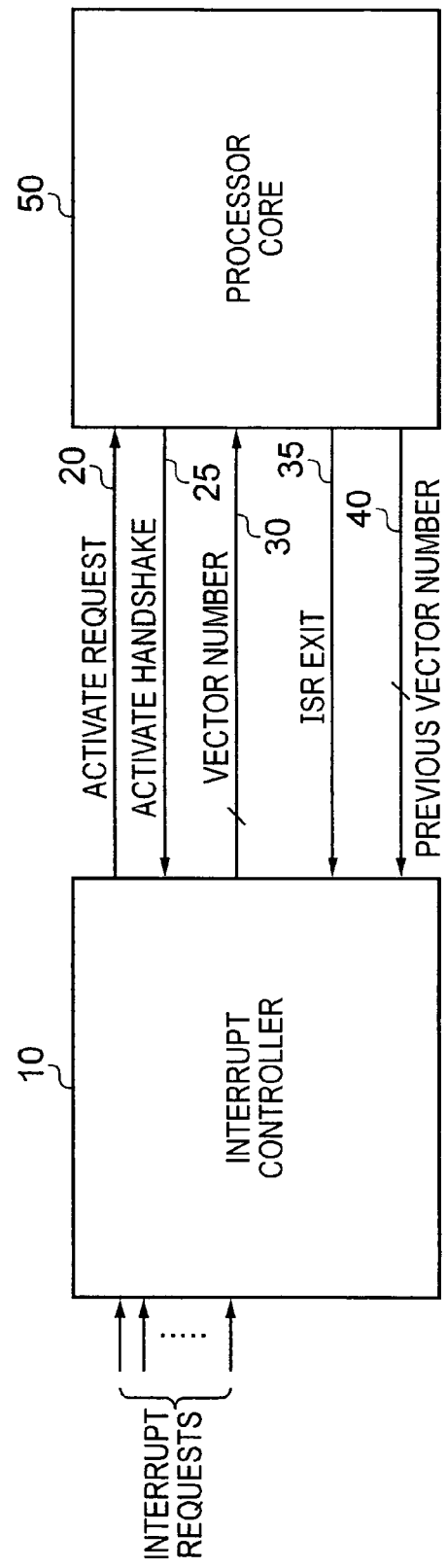
FIG. 1 is a block diagram of a data processing apparatus.

FIG. 1 is a block diagram of data processing apparatus. A processor core 50 is provided for performing data processing operations, the processor core 50 being connected to an interrupt controller 10, and the interrupt controller 10 being arranged to receive interrupt requests generated by devices (not shown). In particular, when a device requires the processor core 50 to perform a service routine, it will issue an interrupt request to the interrupt controller 10. The interrupt controller 10 is discussed in more detail later with reference to subsequent figures, but in brief is arranged to priorities between the various interrupt requests it receives in order to output an activate request over path 20 to the processor core 50, along with an associated vector number output over path 30 to identify an ISR to be executed by the processor core in order to service the selected interrupt.

Once the request is accepted by the processor core 50 it issues an activate handshake signal over path 25 to the interrupt controller 10. Further, when the ISR completes, the processor core 50 issues an ISR exit signal over path 35 to the interrupt controller 10. In association with that ISR exit signal, the processor core 50 may also output a previous vector number over path 40. Typically, this previous vector number 40 can be set to a "don't care" value, unless the ISR being exited from pre-empted an ISR already in the process of being executed by the processor core 50, in which case that previous vector number will identify the ISR that was in the process of being executed at the time the current ISR (i.e. the ISR being existed from) began execution.

Pre-emption will typically occur when a new interrupt request received by the interrupt controller has a higher priority than an interrupt request whose associated ISR is in the process of being executed by the processor core. In that scenario, the ISR currently being executed by the processor core will be stopped and its context (i.e. register contents) saved to allow it to be returned to later, so that the processor core can instead execute the ISR associated with the higher priority interrupt. When the ISR then exits, the previous vector number provided over path 40 will identify the ISR that was stopped, and is now being resumed (using the saved context).

Figure 2:
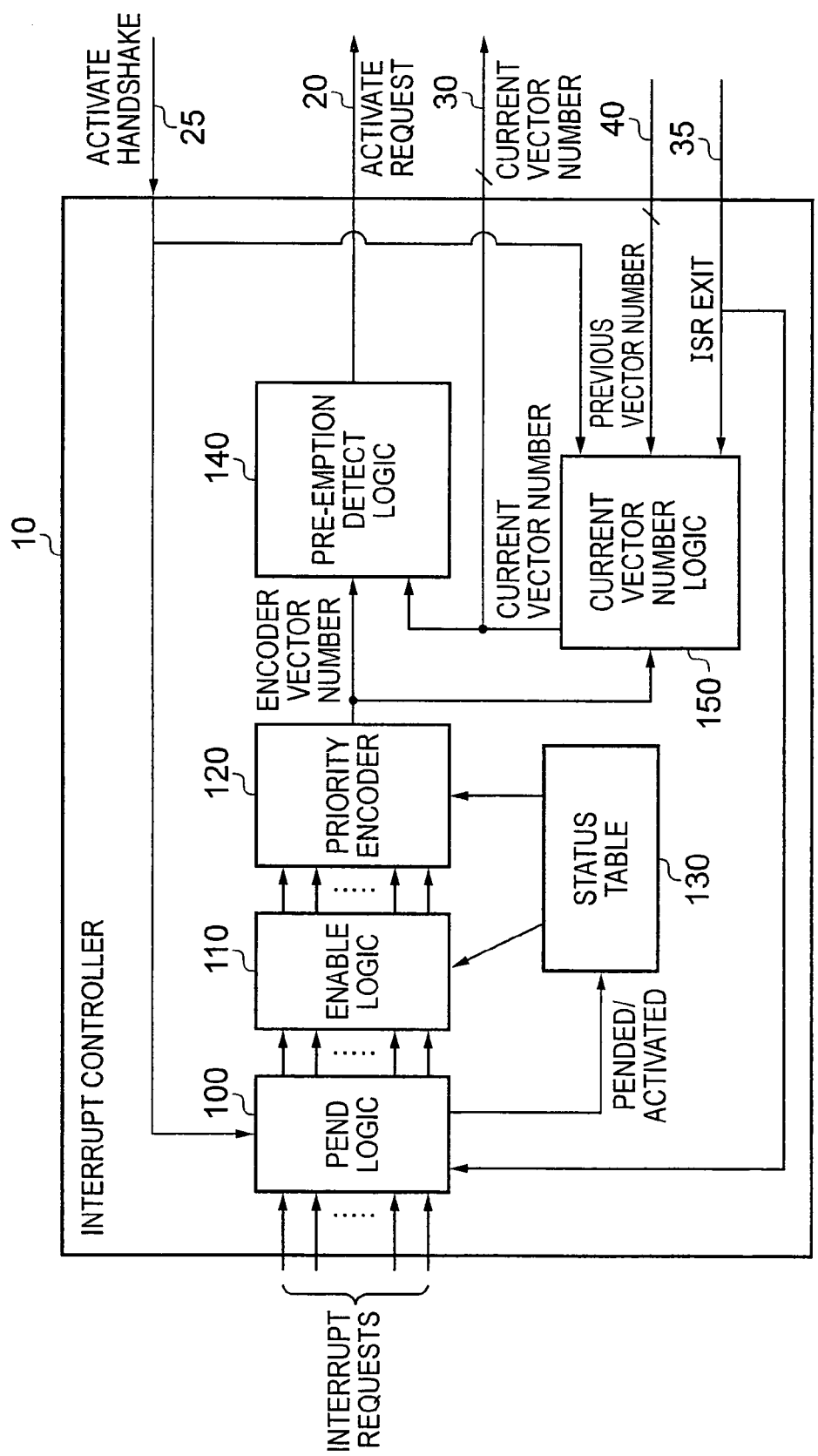
FIG. 2 is a block diagram illustrating in more detail elements provided within the interrupt controller.

FIG. 2 is a block diagram illustrating in more detail the interrupt controller 10 shown in FIG. 1. Any interrupt requests received by the interrupt controller 10 are first passed to the pend logic 100. For each interrupt source, and hence each interrupt request input to the pend logic 100, the pend logic is operable to detect a transition of an interrupt request signal from an unset state to a set state, and on detecting such a transition is arranged to accept the interrupt request for handling by the interrupt controller 10. When accepting an interrupt request in this manner, the pend logic 100 is arranged to set a pended flag provided within the status table 130. Also provided within the status table 130 is an activated flag associated with each interrupt source. When the interrupt controller 10 issues an activate request requesting the processor to execute an ISR in order to service a particular interrupt request, and the corresponding activate handshake signal is returned to the interrupt controller 10 from the processor core 50, then pend logic 100 is arranged to clear the pended flag and at the same time set the activated flag.

If whilst a particular activated flag is set and the corresponding pended flag is clear, the pend logic 100 detects a transition of the relevant interrupt request from an unset state to a set state, then the pend logic is operable to re-accept the interrupt request, this being achieved by re-setting the pended flag. By such an approach, it is possible for a second assertion of an interrupt request by a device employing pulsed interrupt requests to be captured by the pend logic 100 when that second assertion happens before completion of the associated ISR by the processor core 50. Hence, when the ISR does complete execution, then the re-pended interrupt request can immediately be actioned, assuming that interrupt request is still the highest priority request pending within the interrupt controller 10.

For each interrupt source, the pend logic 100 outputs a signal to enable logic 110, the output for a particular interrupt source being set if an interrupt request from that interrupt source has been pended within the pend logic 100.

The status table 130 includes an entry for each interrupt source, and that entry includes an enable flag identifying whether interrupts from that interrupt source are enabled, and hence whether the processor core 50 will execute the required ISR in response to such interrupts. Through use of the enable flag in the status table 130 it is hence possible for the interrupt controller 10 to be configured to ignore interrupt requests from particular interrupt sources. The enable logic 110 can hence be seen as applying a mask type of function to the data it receives from the pend logic 100. The enable logic 110 then outputs a signal associated with each interrupt source, which is set if an interrupt request from that interrupt source has been pended by the pend logic 100 and is an enabled interrupt.

The status table 130 is also configured to provide a priority value associated with each interrupt source, and on receipt of the various signals from the enable logic 110 the priority encoder 120 is arranged to reference the status table 130 in order to decide, in the event of multiple set input signals, which is associated with the highest priority interrupt request. When this has been determined by the priority encoder 120, the priority encoder will then reference a list of vector numbers held within the interrupt controller 110 in order to determine a vector number for the ISR associated with that highest priority pended and enabled interrupt request. That vector number is then output as the encoder vector number to both pre-emption detect logic 140 and current vector number logic 150.

The operation of the current vector number logic 150 will be discussed in more detail later with reference to FIG. 6, but its purpose is to maintain a current vector number which can be output in association with an activate request 20 issued by the pre-emption detect logic 140. As shown in FIG. 2, to enable the current vector number logic 150 to achieve this, the current vector number logic 150 also receives as inputs the ISR exit signal 35 issued from the processor core 50 along with the associated previous vector number issued over path 40 from the processor core 50, and also receives the activate handshake signal received over path 25 from the processor core 50.

The pre-emption detect logic 140 is arranged to determine with reference to the status table 130 the priorities associated with the encoder vector number and the current vector number, or more particularly the priorities associated with the interrupt sources for which those vector numbers represent the associated ISR, and then to determine whether the encoder vector number has a higher priority than the current vector number. If not, then the activate request signal is not set, but if the encoder vector number does have a higher priority than the current vector number then the activate request signal is set by the pre-emption detect logic 140. If at the time of the priority comparison, the processor core is not executing an ISR, the current vector number will be set to a "don't care" state having a priority less than the minimum valid priority level of an interrupt request, and so the activate request signal will be set.

It should be noted that additional functionality can be added if desired using "mask" registers/bits, which can be used to allow the priority associated with the current vector number to be changed artificially and temporarily, for example to stop further interrupts for some selected period of time (by stopping setting of the associated activate request signal from the pre-emption detect logic 140).

If at the time the activate request signal is set, the processor core is executing a program thread, this will cause the processor core 50 to stop execution of the current program thread, to save the context of that thread for future use, and to issue an activate handshake signal over path 25 to signal to the interrupt controller 10 that it is accepting the activate request issued by the interrupt controller. At this point, the current vector number logic 150 is arranged to update the current vector number so that it now corresponds to the encoder vector number, and accordingly identifies to the processor core the ISR that now needs executing. When the ISR exits, the context of the program thread that was stopped will be restored (along with the relevant Program Counter (PC) value), and execution of that program thread will continue.

If the stopped program thread was in fact another ISR, the vector number of the ISR that was stopped is maintained by the processor core 50 as the previous vector number, such that when the newly received ISR completes execution, resulting in the ISR exit signal on path 35 being set, the current vector number logic 150 then updates the current vector number so that it now corresponds to the previous vector number. Hence, the current vector number now identifies the ISR that the processor core has resumed execution of following the ISR exit process. Clearly if at this point there is a further pending interrupt whose vector number has a higher priority than the current vector number, this will cause the pre-emption detect logic 140 to once again set the activate request signal, causing the ISR currently executing on the processor core to once again be stopped (and its context saved).

Figure 3:
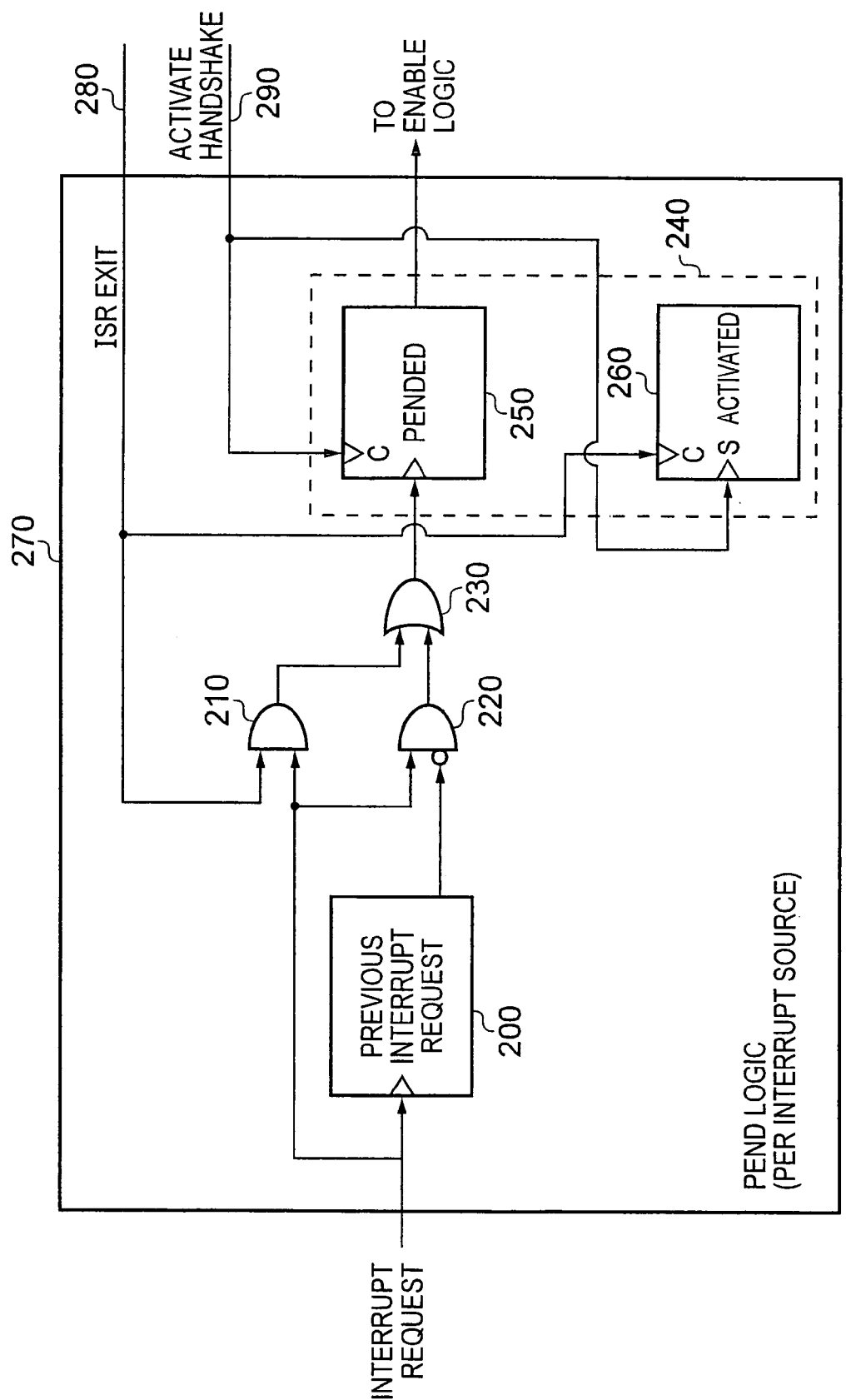
FIG. 3 is a block diagram illustrating in more detail the pend logic of FIG. 2.

FIG. 3 is a block diagram illustrating in more detail logic 270 provided in the pend logic 100, the logic 270 being replicated for each interrupt source. Flop 200 is arranged to receive the interrupt request signal from the associated interrupt source and to store the value of that interrupt request signal as a previous interrupt request value. In the example of FIG. 3, it is assumed that a cleared interrupt request has a logic zero value and a set interrupt request has a logic 1 value, but it will be appreciated that the values for the clear and set states can be reversed in alternative embodiments.

The interrupt request signal is also routed to the input of AND gate 210 and to the input of AND gate 220. AND gate 220 receives as its second input an inverted version of the value stored within the flop 200. Accordingly, it will be seen that on the rising edge of a clock signal, the first input of AND gate 220 receives the current interrupt request value, whilst the second input receives an inverted version of the value of the interrupt request on the preceding rising clock edge. Accordingly, if the value of the interrupt request in the preceding cycle, i.e. the previous interrupt request value stored in flop 200 is a logic zero value, and the current interrupt request has a logic 1 value, then this will cause a logic 1 value to be output from AND gate 220. Hence, when the output of AND gate 220 is set to a logic 1 value, this indicates that the pend logic has detected a transition of the associated interrupt request from an unset state to a set state. If a logic 1 value is output by the AND gate 220, then this is routed via the OR gate 230 to the flop 250 causing the value of that flop to be set. Flop 250 hence represents the pended flag.

The pended flag in the flop 250 can also be set if the output of AND gate 210 is set. As shown in FIG. 3, AND gate 210 receives the current interrupt request signal value and also receives the ISR exit signal over path 280, this ISR exit signal being set to a logic 1 value when execution of the ISR associated with the particular interrupt source completes execution within the processor core 50. Thus the ISR exit signal on path 280 can be seen to be a conditioned version of the ISR exit signal on path 35 of FIGS. 1 and 2, since it is only set if the signal on path 35 is set and the ISR being exited from is associated with the particular interrupt for which logic 270 is provided.

Hence, if at the time the ISR exit signal on path 280 is set, the associated interrupt request signal is also set, then this causes a logic 1 value to be output by AND gate 210, and routed via OR gate 230 to the flop 250 to cause the pended flag to be set. This hence enables correct operation of the interrupt controller when an interrupt source using level interrupts keeps the interrupt request asserted even when the ISR completes. As mentioned earlier this may occur when the relevant interrupt source considers that the event giving rise to the interrupt request has not yet been fully handled, as may for example occur if that device's buffer has not been drained by the ISR at the time the ISR exits. This can happen for a number of reasons, for example because the ISR only reads one data element from the device buffer when in fact there are more than one data element in the buffer, or alternatively may occur when new data is stored in the buffer after the ISR has read the status register.

The value of the flop 250 is output to the enable logic 110, and accordingly will indicate to the enable logic whether the interrupt request for the associated interrupt source has been pended or not by the pend logic.

As discussed earlier with reference to FIG. 2, when an activate request is issued from the interrupt controller 10, this will result in an associated activate handshake signal being returned from the processor core 50 over path 25. As shown in FIG. 3, if this activate handshake signal relates to the particular interrupt for which logic 270 is provided, this will cause a set activate handshake signal to be routed to the flop 250 over path 290, and when set will cause the value stored in that flop to be returned to a logic zero value, hence indicating that the associated interrupt request is no longer pended. At the same time, the activate handshake signal on path 290 is also routed to the flop 260 to cause the flop 260 to be set. The flop 260 hence represents the activated flag for the associated interrupt source. As shown in FIG. 3, the activated flag is cleared when the ISR exit signal for the associated interrupt source on path 280 is set.

As represented by the dotted line 240 in FIG. 3, the flops 250 and 260 store state which is considered to be part of the status table 130 illustrated in FIG. 2. Whilst for ease of illustration the status table 130 in FIG. 2 has been shown as a separate entity, it is often the case that the various fields making up that status table will be dispersed within various elements of the interrupt controller. Hence, in the particular example illustrated in FIG. 3, the pended flag field and the activated field are actually provided by elements of the pend logic. Alternatively in other embodiments, this pended and activated status can be stored elsewhere.

Figure 4:
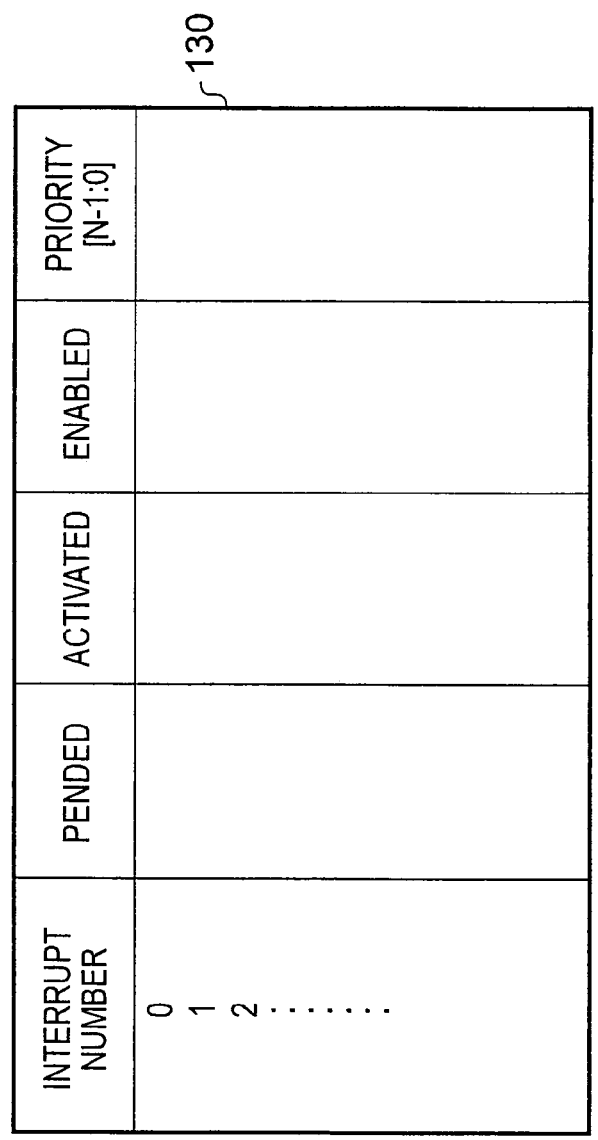
FIG. 4 is a diagram illustrating fields provided in the status table of FIG. 2.

FIG. 4 is a diagram schematically illustrating the fields that may be provided within the status table 130. As discussed earlier, there is a separate entry for each interrupt source, in this example each interrupt source being allocated a unique number. Further, each entry contains a pended field, an activated field and an enabled field, which typically are single bit fields indicating whether, for the associated interrupt source, there is an interrupt request which is pended, activated, enabled, respectively. Further an N-bit field is also provided for each entry identifying the priority of the associated interrupt source. The number of bits required for the priority field will depend on the number of different priority levels that can be assigned to the interrupt sources.

Figure 5:
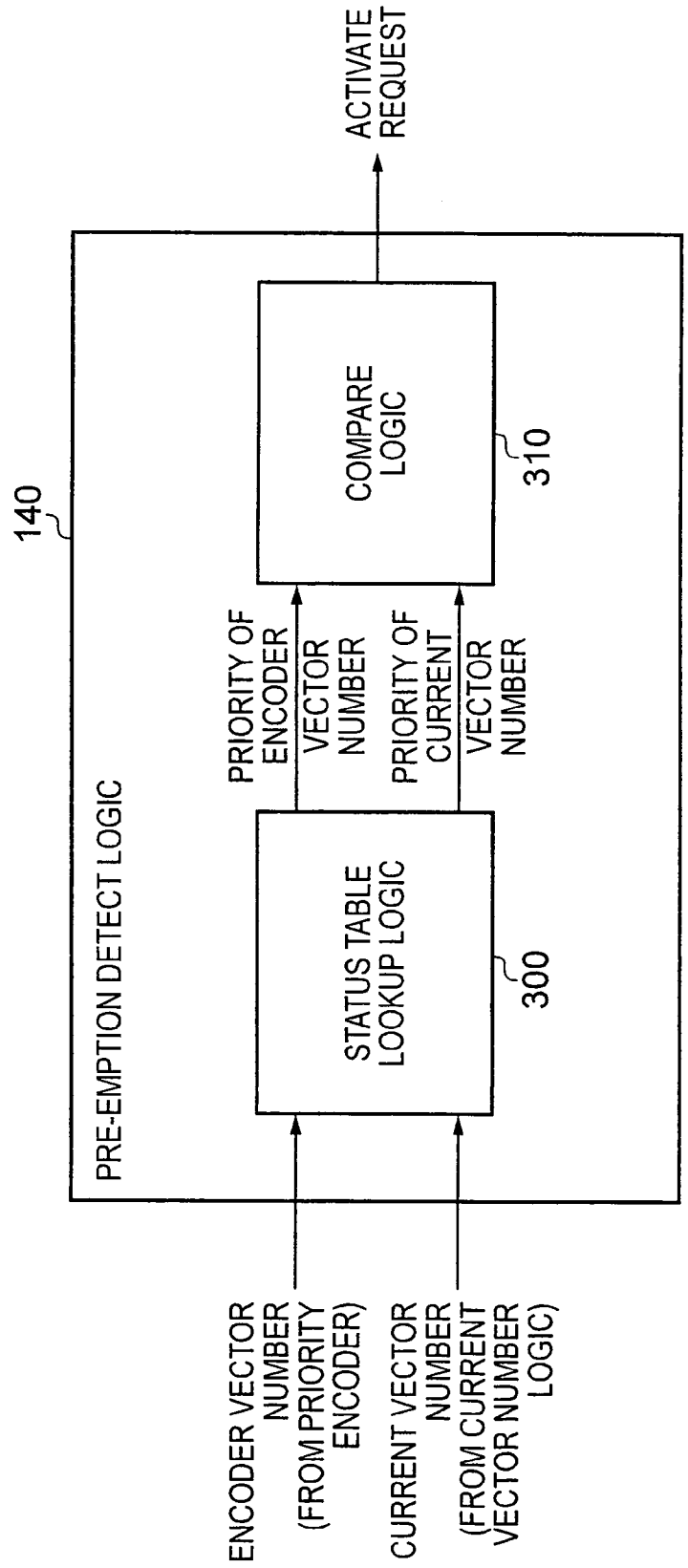
FIG. 5 is a diagram illustrating elements provided within the pre-emption detect logic of FIG. 2.

FIG. 5 is a block diagram illustrating in more detail the pre-emption detect logic 140 of FIG. 2. As discussed earlier with reference to FIG. 2, the pre-emption detect logic 140 is arranged to receive the encoder vector number output from the priority encoder 120 and the current vector number output by the current vector number logic 150. These inputs are passed to status table lookup logic 300 which is arranged to reference the status table 130 in order to determine the priority level associated with each of the two inputs, resulting in the priority of the encoder vector number and the priority of the current vector number being routed to the compare logic 310. The compare logic 310 is arranged to compare the two input priority values to determine if the priority of the encoder vector number is greater than the priority of the current vector number. If so, the compare logic sets the activate request signal, whereas if instead the priority of the encoder vector number is less than or equal to the priority of the current vector number, then the compare logic does not set the activate request signal.

Figure 6:
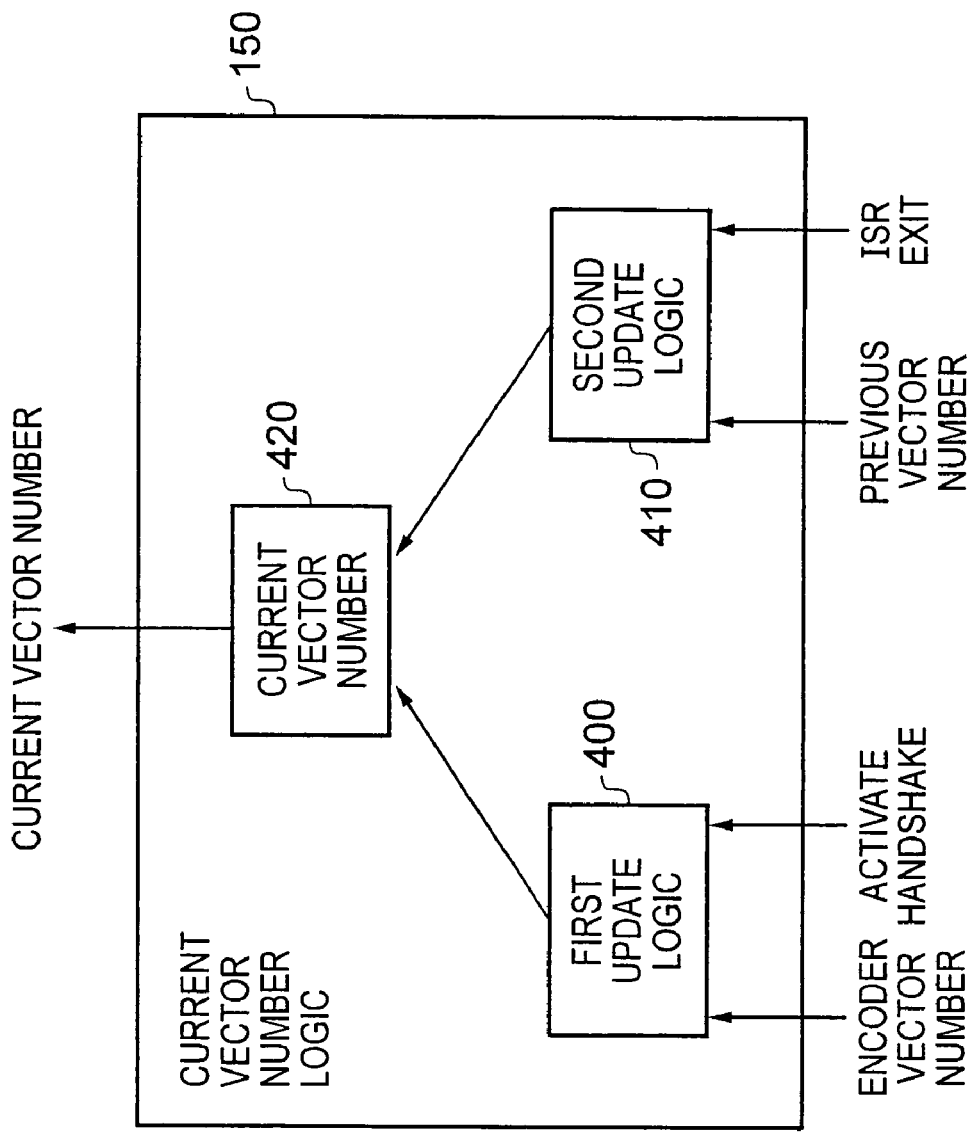
FIG. 6 is a block diagram illustrating in more detail the current vector number logic of FIG. 2.

FIG. 6 is a diagram illustrating in more detail the current vector number logic 150 of FIG. 2. The current vector number logic 150 includes two pieces of update logic, namely first update logic 400 and second update logic 410. The first update logic 400 receives as input signals the encoder vector number and the activate handshake signal. When the activate handshake signal is set, the first update logic 400 causes the encoder vector number to be stored as the current vector number in storage 420. Accordingly, when the activate handshake signal is set, the current vector number output by the current vector number logic 150 changes to correspond to the encoder vector number input to first update logic 400. It should be noted from the earlier described FIG. 2 that the encoder vector number output by the priority encoder 120 is registered (copied) during the period between the activate request being issued and the activate handshake being returned, and accordingly the encoder vector number input to the first update logic 400 corresponds to the ISR of the interrupt request that caused the activate request signal to be set.

The second update logic 410 receives the previous vector number and ISR exit signal output by the processor core 50. When the ISR exit signal is set, the second update logic 410 causes the previous vector number to be stored as the current vector number in the storage 420, which may for example be a register. If at the time of the ISR exit signal, there is no ISR to be resumed within the processor core, then this will cause the current vector number to be set to a don't care state. In this instance, when the status table lookup logic 300 seeks to establish the priority level of the current vector number, it will determine that priority level to be less than the minimum valid priority level of an interrupt request. As discussed earlier, if an enabled interrupt is then pended and its associated vector number has a higher priority than the current vector number (which it always will have for the don't care state discussed above), this will cause the compare logic 310 to output a set activate request to initiate processing of the associated ISR by the processor core.

Figure 7:
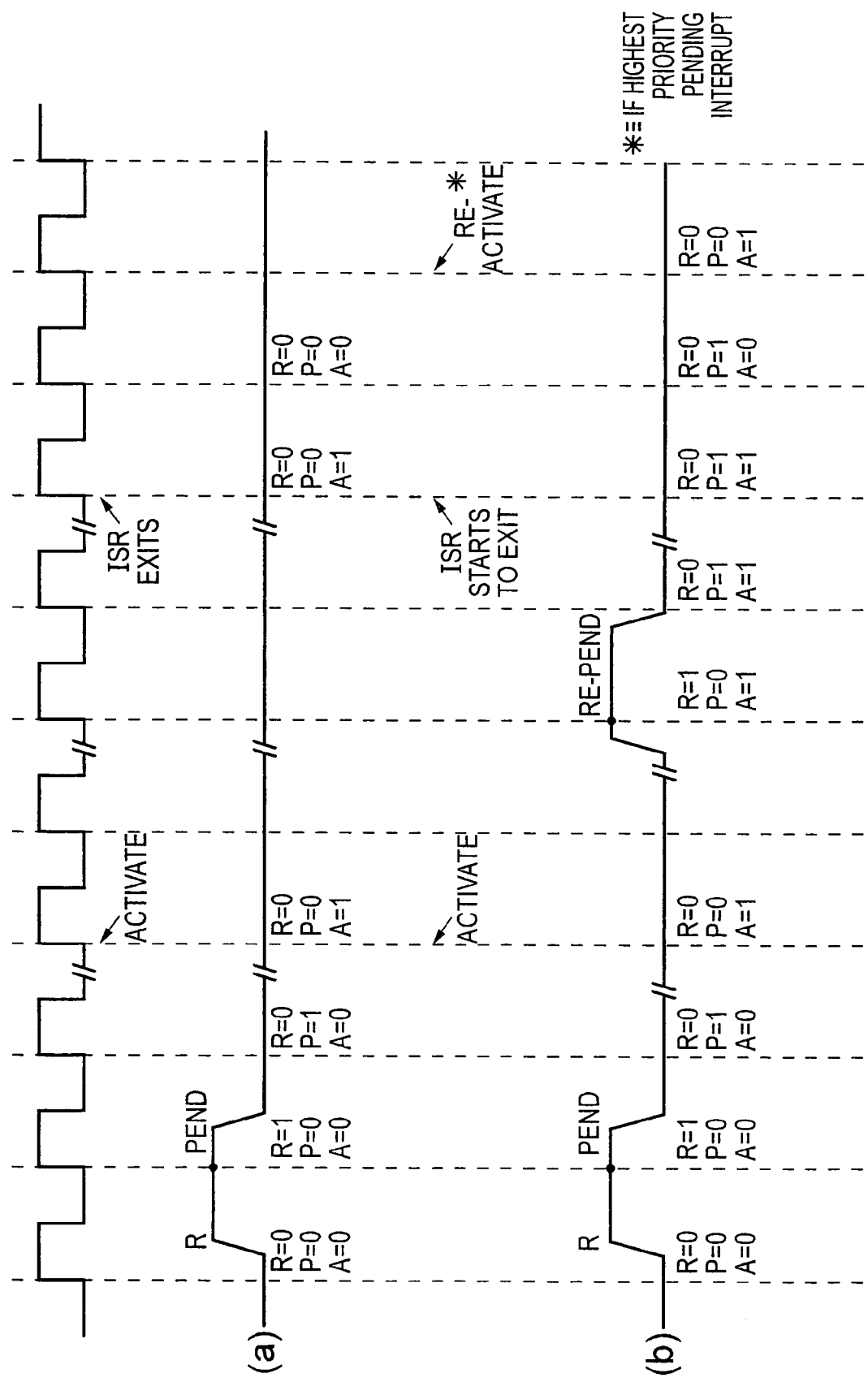
FIGS. 7 and 8 are timing diagrams illustrating the handling of interrupt requests by the interrupt controller.

FIG. 7 is a timing diagram illustrating the handling of pulsed interrupts by the interrupt controller of FIG. 2. Signal path (a) illustrates a normal usage for a pulsed interrupt, for example a timer, where the interrupt signal is asserted for one or so clock cycles thus causing the relevant ISR to be activated when the priority of the associated interrupt request allows. The behavior illustrated by signal (a) in FIG. 7 can also be illustrated schematically in the following Table 1 below, where P means pended, A means activated and R means the raw signal state:

TABLE 1

| R | P | A | Status | Result |
|---|---|---|---|---|
| 0 | 0 | 0 | Interrupt signal low | No action |
| 1 | 0 | 0 | Interrupt Signal is High | P = 1/A = 0 - pended |
| 0 | 1 | 0 | Priority not highest | No change - still pended |
| 0 | 1 | 0 | Priority highest | P = 0/A = 1 - activated |
| 0 | 0 | 1 | Interrupt signal still low | No change - still active |
| 0 | 0 | 0 | Return from ISR | Returns normally |

In the above Table 1, and indeed in Tables 2 to 4 which follow, it should be noted that the "Priority not highest" row is not required, but is merely used to illustrate that there will not be a transition from the pended to active state until the priority of the pended interrupt is higher than the priority of the current vector number.

It will be appreciated that whilst in FIG. 7 the pulse interrupt is shown as being asserted for a single cycle, there is no requirement for the pulse to be asserted for only one cycle as shown, but instead it can be asserted for more than one cycle but not so long that the associated ISR could complete before it is de-asserted (which for example would be at least 20 cycles for a very fast ISR). This is true for both the normal pend operation illustrated by signal (a) in FIG. 7, and the re-pend process illustrated by signal (b) in FIG. 7. The re-pend usage model illustrated by signal (b) in FIG. 7 can also be illustrated schematically by the following Table 2:

TABLE 2

| R | P | A | Status | Result |
|---|---|---|---|---|
| 0 | 0 | 0 | Interrupt signal low | No action |
| 1 | 0 | 0 | Interrupt Signal is High | P = 1/A = 0 - pended |
| 0 | 1 | 0 | Priority not highest | No change - still pended |
| 0 | 1 | 0 | Priority highest | P = 0/A = 1 - activated |
| 0 | 0 | 1 | Interrupt signal still low | No change - still active |
| 1 | 0 | 1 | Interrupt signal goes high | P = 1/A = 1 - pended and active |
| 0 | 1 | 1 | Interrupt goes low (pulse) | No change (P = 1 and A = 1) - pulse not lost |
| 0 | 1 | 0 | Return from ISR | Since P = 1, it re-activates |
| 0 | 0 | 1 | Re-activates | Re-activates immediately |

It should be noted that for the re-pend usage model where the interrupt request is pulsed when active, the pulse may overlap the ISR exit, but since it will already be pended this does not cause any problems.

The risk with normal edge/pulsed interrupts is that a second assertion may be lost if it occurs before completion of the ISR associated with that interrupt source. The technique of embodiments of the present invention solves this problem by allowing a re-pending of the interrupt request whilst the ISR routine is active, as indicated by the activated flag. This is detected by the interrupt request signal going from a low to a high state whilst the activated flag is still set. This scenario is also applicable to interrupt sources using level interrupt signals in situations where the ISR completes the required event handling, causing the level interrupt signal to be cleared, but then new data arrives before the ISR returns. This only differs from the normal interrupt case that will be discussed below with reference to FIG. 8, signal (a), in that it re-activates that ISR more quickly, since in one embodiment the ISR re-activates on return immediately, provided the interrupt request in question is still the highest priority pending and enabled interrupt.

Figure 8:
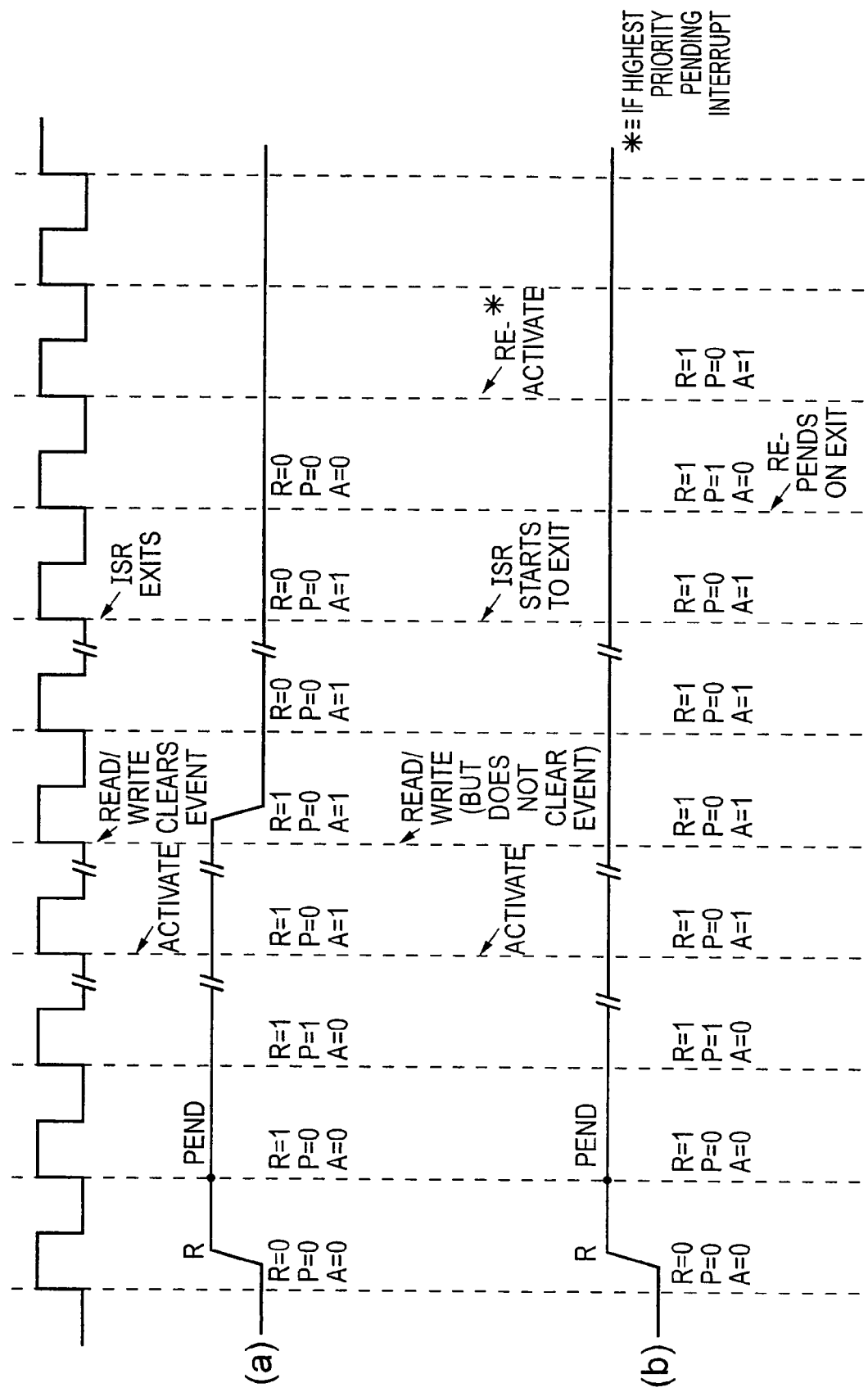

FIG. 8 is a timing diagram illustrating the handling of level interrupt requests for both a normal usage model as shown by signal (a) and a re-pend usage model as shown by signal (b). The normal usage model can also be illustrated by Table 3 below:

TABLE 3

| R | P | A | Status | Result |
|---|---|---|--------|--------|
| 0 | 0 | 0 | Interrupt signal low | No action |
| 1 | 0 | 0 | Interrupt Signal is High | P = 1/A = 0 - pended |
| 1 | 1 | 0 | Priority not highest | No change - still pended |
| 1 | 1 | 0 | Priority highest | P = 0/A = 1 - activated |
| 1 | 0 | 1 | Interrupt signal still High | No change - still active |
| 0 | 0 | 1 | Interrupt signal goes low | No change ISR action caused it to go low (e.g. register read) |
| 0 | 0 | 0 | Return from ISR | Back to inactive |

In accordance with the normal usage model, the ISR performs one or more operations which clears the state of the device issuing the interrupt request, and accordingly the interrupt request is de-asserted by the device. As shown in FIG. 8, this may occur as a result of the ISR performing a read or write operation to clear the event that caused the interrupt request to be issued, thereby causing the request signal to be deasserted thereafter.

The re-pend usage model shown in FIG. 8, signal (b) can also be illustrated with reference to table 4 below:

TABLE 4

| R | P | A | Status | Result |
|---|---|---|--------|--------|
| 0 | 0 | 0 | Interrupt signal low | No action |
| 1 | 0 | 0 | Interrupt Signal is High | P = 1/A = 0 - pended |
| 1 | 1 | 0 | Priority not highest | No change - still pended |
| 1 | 1 | 0 | Priority highest | P = 0/A = 1 - activated |
| 1 | 0 | 1 | Interrupt signal still High | No change - still active (ISR has not drained buffer) |
| 1 | 1 | 0 | Return from ISR | Re-pends interrupt since request still active |
| 1 | 0 | 1 | Re-activates since pended | Pend propagates to A = 1 (So, a few pops may have gone by from ISR return, and then it re-enters the ISR again). |

The re-pend usage model occurs when, for example, the buffer of the device issuing the interrupt request is not drained fully when the ISR returns. This can happen, for example, when the ISR only takes one element from the device, but also may occur when new data arrives after the ISR has read the device's status register (although this may instead look like the pulse interrupt re-pend usage model described earlier with reference to Table 2 and FIG. 7, signal (b), if the interrupt is de-asserted in the meantime.

It should be noted that in one embodiment the re-activation can be optimized by recognizing that the ISR exit procedure is taking place, and re-entering it directly.

For level interrupt requests, is not important when exactly the interrupt request is de-asserted, it only being necessary for the interrupt request to be de-asserted before the ISR exits if it is not to be re-pended. It should also be noted that occasional re-pending of level interrupt requests when not actually needed does not represent a problem, as the interrupt handler will detect there is nothing for it and will accordingly return.

It should be noted that FIGS. 7 and 8 and the associated tables show re-activation (i.e. where the ISR returns from a pend+active state and then activates again) on the assumption that the priority and superiority allow the same interrupt to re-activate. If other interrupts are waiting with the same priority, one of them may in fact activate first and the original one may activate after that.

From the above description, it will be appreciated that the interrupt controller in accordance with the described example embodiment supports both level interrupts and pulse interrupts with no configuration from software being required, thereby enabling any device to use either level interrupts or pulse interrupts and be supported automatically by the interrupt controller. For pulsed interrupts, the device can simply generate an assertion on the interrupt line for one or so clock cycles. If the device issues an interrupt signal that is asynchronous to the clock domain of the interrupt controller, such as may occur when the interrupt request is issued from a device which is off-chip, synchronizing logic may need to be provided at the input to the interrupt controller in order to provide meta-stability support. As is known in the art, synchronizer logic will re-synchronize the interrupt to the clock used by the interrupt controller, thereby producing a pulse of the required duration to be sampled by that clock. The synchronizer may be implemented, for example, with two or three flops in series, or through some appropriate handshake model. For edge interrupts of very short duration, a few flops are arranged so that a rising edge sets a flop, but only a clock synchronized flop clears it. This approach works well for inputs which can be level or edge based inputs, since edge pulses of short duration are converted to pulses of one clock cycle in length, whilst level inputs are cleared on the next clocked edge that they have a logic zero level.

Although a particular embodiment of the invention has been described herein, it will be apparent that the invention is not limited thereto, and that many modifications and additions may be made within the scope of the invention. For example, various combinations of the features of the following dependent claims could be made with the features of the independent claims without departing from the scope of the present invention.

We claim:

1. An interrupt controller for handling interrupt requests generated by a plurality of interrupt sources, comprising:
    pend logic configured to receive interrupt requests generated by said plurality of interrupt sources and for each interrupt request to determine whether to accept that interrupt request for handling by the interrupt controller; and
    interrupt handling logic configured to select an interrupt request from amongst those interrupt requests accepted by the pend logic, and to generate an indication of an interrupt routine to be executed by a processor to process that interrupt request;
    the pend logic being configured for each of said interrupt sources to detect a transition of the associated interrupt request from an unset state to a set state, and to accept said interrupt request upon said detection;
    the pend logic being further configured to receive an exit signal indicating completion of said interrupt routine by the processor, and if the associated interrupt request is in the set state on receipt of said exit signal, to re-accept that interrupt request.

2. An interrupt controller as claimed in claim 1, further comprising:
    first storage providing a pended flag associated with each interrupt source, the pend logic being configured upon accepting an interrupt request to cause the associated pended flag to be set.

3. An interrupt controller as claimed in claim 2, further comprising second storage providing an activated flag associated with each interrupt source, upon an indication from the processor that the interrupt routine associated with a particular interrupt request will be executed, the interrupt controller causing the associated activated flag to be set and the associated pended flag to be cleared.

4. An interrupt controller as claimed in claim 3, wherein if, for a particular interrupt source, the pend logic detects a transition of the associated interrupt request from an unset state to a set state while the associated activated flag is set and the associated pended flag is cleared, the pend logic is configured to re-accept said interrupt request.

5. A method of handling within a data processing apparatus interrupt requests generated by a plurality of interrupt sources, comprising the steps of:
 (a) receiving interrupt requests generated by said plurality of interrupt sources;
 (b) for each interrupt request determining whether to accept that interrupt request for handling; and
 (c) selecting an interrupt request from amongst those interrupt requests accepted at step (b), and generating an indication of an interrupt routine to be executed by a processor to process that interrupt request;
 said step (b) comprising the steps of:
  (i) for each of said interrupt sources detecting a transition of the associated interrupt request from an unset state to a set state, and accepting said interrupt request upon said detection;
  (ii) receiving an exit signal indicating completion of said interrupt routine by the processor, and if the associated interrupt request is in the set state on receipt of said exit signal, re-accepting that interrupt request.

6. The method in claim 5, wherein a pended flag is associated with each interrupt source, the method further comprising:
 causing the associated pended flag to be set upon accepting an interrupt request.

7. The method in claim 6, wherein an activated flag is associated with each interrupt source, the method further comprising:
 causing the associated activated flag to be set and the associated pended flag to be cleared based on an indication that the interrupt routine associated with a particular interrupt request will be executed.

8. The method in claim 7, wherein if, for a particular interrupt source, a transition of the associated interrupt request from an unset state to a set state is detected while the associated activated flag is set and the associated pended flag is cleared, then re-accepting said interrupt request.

9. The method of claim 5 implemented in an interrupt controller.

10. An interrupt controller in a data processor for handling interrupt requests generated by a plurality of interrupt sources, comprising:
 means for receiving interrupt requests generated by said plurality of interrupt sources;
 means, for each interrupt request, for determining whether to accept that interrupt request for handling; and
 means for selecting an interrupt request from among the accepted interrupt requests and generating an indication of an interrupt routine to be executed by the data processor to process that interrupt request;
 wherein the means for determining is configured, for each of said interrupt sources, to:
  detect a transition of the associated interrupt request an unset state to a set state and accept said interrupt request upon said detection, and
  to receive an exit signal indicating completion of said interrupt routine by the data processor, and if the associated interrupt request is in the set state on receipt of said exit signal, to re-accept that interrupt request.

* * * * *